(12) United States Patent
Na et al.

(10) Patent No.: US 11,272,401 B2
(45) Date of Patent: Mar. 8, 2022

(54) TERMINAL DEVICE AND UPLINK DATA TRANSMISSION METHOD

(71) Applicant: SK TELECOM CO., LTD., Seoul (KR)

(72) Inventors: Min Soo Na, Seoul (KR); Chang Soon Choi, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 69 days.

(21) Appl. No.: 16/605,485

(22) PCT Filed: Jan. 15, 2018

(86) PCT No.: PCT/KR2018/000690
§ 371 (c)(1),
(2) Date: Oct. 15, 2019

(87) PCT Pub. No.: WO2019/004547
PCT Pub. Date: Jan. 3, 2019

(65) Prior Publication Data
US 2020/0128443 A1   Apr. 23, 2020

(30) Foreign Application Priority Data
Jun. 28, 2017  (KR) .................. 10-2017-0081798

(51) Int. Cl.
*H04W 28/12* (2009.01)
*H04W 76/27* (2018.01)
*H04W 76/18* (2018.01)
*H04W 76/30* (2018.01)
*H04W 28/02* (2009.01)

(52) U.S. Cl.
CPC ....... *H04W 28/12* (2013.01); *H04W 28/0247* (2013.01); *H04W 76/18* (2018.02); *H04W 76/27* (2018.02); *H04W 76/30* (2018.02)

(58) Field of Classification Search
None
See application file for complete search history.

(56) References Cited

U.S. PATENT DOCUMENTS

| 2008/0123589 | A1  | 5/2008  | Lee et al. |
| 2014/0341165 | A1  | 11/2014 | Wang et al. |
| 2016/0366704 | A1  | 12/2016 | Lee et al. |
| 2019/0223229 | A1* | 7/2019  | Sharma ................. H04W 76/10 |
| 2019/0289570 | A1* | 9/2019  | Kim ...................... H04W 76/19 |

(Continued)

FOREIGN PATENT DOCUMENTS

KR   10-2008-0048292   6/2008

OTHER PUBLICATIONS

International Search Report dated Apr. 20, 2018 issued in Application No. PCT/KR2018/000690.

(Continued)

*Primary Examiner* — Joseph E Avellino
*Assistant Examiner* — The Hy Nguyen
(74) *Attorney, Agent, or Firm* — KED & Associates LLP

(57) ABSTRACT

Disclosed is a technology for deriving an effect of meeting a demand of a scenario (for example, mMTC) supported by a 5G communication system and supporting service performance by implementing new uplink data transmission considering energy efficiency of a terminal and connection density of a base station.

16 Claims, 3 Drawing Sheets

(56) References Cited

U.S. PATENT DOCUMENTS

| | | | | |
|---|---|---|---|---|
| 2019/0349813 A1* | 11/2019 | Kim | .................... | H04W 40/005 |
| 2020/0022214 A1* | 1/2020 | Takahashi | ............. | H04W 76/11 |
| 2020/0037345 A1* | 1/2020 | Ryoo | .................... | H04W 76/10 |
| 2020/0163148 A1* | 5/2020 | Futaki | ................... | H04W 36/36 |
| 2020/0214073 A1* | 7/2020 | Shimoda | ............... | H04W 16/32 |
| 2021/0144573 A1* | 5/2021 | Yoon | .................... | H04B 7/0632 |
| 2021/0195532 A1* | 6/2021 | Ouchi | ................. | H04W 52/146 |

OTHER PUBLICATIONS

Lee, Kyoung Seok et al., "A Study on the Efficient Data Transmission of Inactive State UEs on 3GPP 5G Systems", Proceedings of KICS (The Korean Institute of Communications and Information Sciences) 2017 Winter Conference, pp. 1335-1336, Jan. 2017.

Samsung, "RRC Connection Control from INACTIVE", R2-1707450, 3GPP TSG-RAN WG2 NR Ad hoc#2, Qingdao, China, Jun. 21, 2017.

"The Efficient Data Transfer of the Inactive State Terminal in 3GPP 5G Mobile Communication System", the Korean Institute of Communication Sciences 2017 year is the cognate synthesis research meeting collection of learned papers including cyanite etc (Jan. 31, 2017).

Samsung, "RRC Connection Control from INACTIVE", R2-1707450, 3GPP TSG-RAN WG2 NR Ad hoc#2 (Jun. 21, 2017).

Korean Office Action dated Nov. 6, 2019 issued in Application No. 10-2017-0081798 (English translation attached).

Korean Office Action dated Nov. 6, 2019 issued in Application No. 10-2018-0074162 (English translation attached).

\* cited by examiner

TERMINAL DEVICE AND UPLINK DATA TRANSMISSION METHOD

CROSS-REFERENCE TO RELATED PATENT APPLICATIONS

This application is a U.S. National Stage Application under 35 U.S.C. § 371 of PCT Application No. PCT/KR2018/000690, filed Jan. 15, 2018, which claims priority to Korean Patent Application No. 10-2017-0081798, filed Jun. 28, 2017, whose entire disclosures are hereby incorporated by reference.

BACKGROUND OF THE INVENTION

1. Field of the Invention

The present disclosure relates to an uplink data transmission technology.

2. Description of the Prior Art

A 5G communication system support scenarios of enhanced Mobile Broadband (eMBB), massive Machine Type Communications (mMTC), Ultra-Reliable and Low Latency Communications (URCCL) while accommodating as many terminals as possible on the basis of limited radio resources.

In the case of mMTC among the scenarios supported by the 5G communication system, energy efficiency on the side of a terminal and connection density on the side of a based station are considered as core indexes.

In the 5G communication system, it may be considered for improving energy efficiency on the side of the terminal and connection density on the side of the base station that RRC-INACTIVE is added/introduced in addition to the conventional RRC-CONNECTED and RRC-IDLE as operation state with respect to a radio section (Radio Resource Control (RRC)) connection.

The operation state of RRC-CONNECTED is a state in which both a radio section connection between the terminal and the base station and a connection between the base station and a core network are configured.

The operation state of RRC-IDLE is a state in which both a radio section connection between the terminal and the base station and a connection between the base station and a core network are released.

The operation state of RRC-INACTIVE may be defined as a state in which a radio section connection between the terminal and the base station is released but a connection between the base station and a core network is configured.

Considering the energy efficiency of the terminal and the connection density of the base station, the RRC-INACTIVE terminal may rapidly transmit uplink data when uplink data is generated compared to the RRC-IDLE state. Also, energy consumption is minimized compared to RRC-CONNECTED state. In addition, the connection density of the base station may be reduced.

However, the 5G communication system has not proposed a detailed method for how the RRC-INACTIVE terminal transmits uplink data when uplink data is generated.

SUMMARY OF THE INVENTION

The present disclosure has been made to propose a new uplink data transmission scheme (technology) considering energy efficiency of a terminal and connection density of a base station.

In accordance with an aspect of the present disclosure, a terminal apparatus includes: a recognition unit configured to recognize generation of uplink data in a specific state in which a radio section connection is released and a connection between a core network and a base station for the terminal apparatus is configured, and a controller configured to transmit a specific message related to configuration of the radio section connection to the base station when the generation of the uplink data is recognized, and transmit the uplink data together with the specific message when the specific message is transmitted.

Specifically, the controller may transmit the uplink data with the specific message, only when the uplink data is a preset specific state transmission type.

Specifically, the uplink data may be the specific state transmission type, when a size of the uplink data is equal to or smaller than a predefined threshold size.

Specifically, the controller may transmit at least one information of state information indicating that the terminal apparatus is in the specific state and channel state information measured by the terminal apparatus when the specific message and the uplink data is transmitted, thereby the base station being able to use the information to allocate uplink resource to the terminal apparatus.

Specifically, the controller may switch the specific state to a connection configuration state in which the radio section connection with the base station is configured and transmit the uplink data through the radio section connection, when transmission failure of the uplink data is identified.

Specifically, the controller may switch the specific state to a connection configuration state in which the radio section connection with the base station is configured and transmit the uplink data through the radio section connection, when the uplink data is not the specific state transmission type.

Specifically, the controller may identify transmission success of the uplink data transmitted together with the specific message and maintain the specific state, when a response message including information defined to maintain the specific state is received in response to the specific message.

Specifically, the controller may identify transmission failure of the uplink data transmitted together with the specific message, when a response message to the specific message for a preset time is not received or transmission failure is received.

Specifically, the controller may insert predefined state switching request identification information into the specific message related to configuration of the radio section connection and transmit the specific message to the base station in order to switch the specific state to the connection configuration state.

Specifically, the controller may receive a response message including information defined to switch the specific state to the connection configuration state in which the radio section connection with the base station is configured in response to the specific message, and configure the radio section connection with the base station based on information within the response message.

Specifically, the specific message may be a message (RRC connection request) transmitted by the terminal apparatus to make a request for the radio section connection to the base station.

Specifically, the response message may be a message (RRC connection reconfiguration) for reconfiguring the radio section connection between the base station and the terminal apparatus.

In accordance with another aspect of the present disclosure, a method of transmitting uplink data by a terminal apparatus may include: recognizing generation of uplink data in a specific state in which a radio section connection is released and a connection between a core network and a base station for the terminal apparatus is configured; and transmitting a specific message related to configuration of the radio section connection to the base station when the generation of the uplink data is recognized, and transmitting the uplink data together with the specific message when the specific message is transmitted.

Specifically, the transmission step may include transmitting the specific message and the uplink data only when the uplink data is a preset specific state transmission type.

Specifically, the method may further include switching the specific state to a connection configuration state in which the radio section connection with the base station is configured and transmitting the uplink data through the radio section connection, when transmission failure of the uplink data is identified.

Specifically, the method may further include switching the specific state to a connection configuration state in which the radio section connection with the base station is configured and transmitting the uplink data through the radio section connection, when the uplink data is not the specific state transmission type.

According to embodiments of the present disclosure, it is possible to derive an effect of meeting a demand of a scenario (for example, mMTC) supported by a 5G communication system and supporting service performance by implementing new uplink data transmission considering energy efficiency of a terminal and connection density of a base station.

DETAILED DESCRIPTION OF THE EXEMPLARY EMBODIMENTS

Hereinafter, exemplary embodiments of the present disclosure will be described with reference to the accompanying drawings.

The present disclosure relates to an uplink data transmission technology where a terminal connected to a core network on the basis of a base station transmits uplink data.

Particularly, the present disclosure considers a 5G communication system which will be introduced in the future.

The 5G communication system support scenarios of enhanced Mobile Broadband (eMBB), massive Machine Type Communications (mMTC), Ultra-Reliable and Low Latency Communications (URCCL) while accommodating as many terminals as possible on the basis of limited radio resources.

In the case of mMTC among the scenarios supported by the 5G communication system, energy efficiency of a terminal and connection density of a base station are considered as core indexes.

Figure 3:
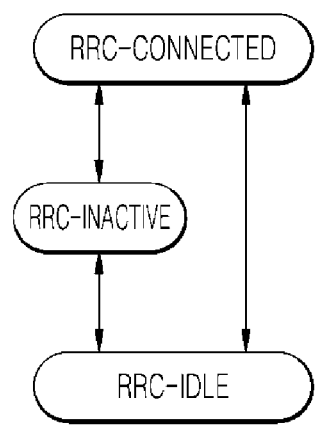
FIG. 3 is a schematic diagram illustrating operation states based on a radio section connection between a terminal and a base station considered by the present disclosure.

Accordingly, as illustrated in FIG. 3, it may be considered for improving energy efficiency on the side of the terminal and connection density on the side of the base station that RRC-INACTIVE is added/introduced in addition to the conventional RRC-CONNECTED and RRC-IDLE as operation state with respect to a radio section (Radio Resource Control (RRC)) connection The operation state of RRC-CONNECTED (that is, a connection configuration state) is a state in which both a radio section connection between the terminal and the base station and a connection between the base station and the core network are configured.

The RRC-CONNECTED terminal may continuously consume energy to maintain the radio section connection with the base station as the configuration state but may immediately transmit uplink data through the radio section connection when uplink data is generated.

The operation state of RRC-IDLE (that is, a connection idle state) is a state in which both a radio section connection between the terminal and the base station and a connection between the base station and the core network are released.

The RRC-IDLE terminal may not need energy consumption to maintain the radio section connection with the base station as the configuration state but may transmit uplink data after passing through a process of configuring all of the connections between the terminal, the base station, and the core network when uplink data is generated.

The operation state of RRC-INACTIVE (that is, a specific state) may be defined as a state in which a radio section connection between the terminal and the base station is released but a connection between the base station and the core network is configured.

Under consideration of energy efficiency on the side of the terminal and connection density on the side of the base station, the RRC-INACTIVE terminal may rapidly transmit uplink data when uplink data is generated compared to the RRC-IDLE state while minimizing energy consumption compared to RRC-CONNECTED state. Also, the base station may reduce connection density.

However, the 5G communication system has not proposed a detailed method for how the RRC-INACTIVE terminal transmits uplink data when uplink data is generated.

Accordingly, the present disclosure provides a detailed method (scheme) by which the RRC-INACTIVE terminal transmits uplink data when uplink data is generated, thereby implementing a new uplink data transmission scheme (technology) considering energy efficiency on the side of the terminal and connection density on the side of the base station.

Hereinafter, the configuration of a terminal apparatus according to an embodiment of the present disclosure will be described with reference to FIG. 1.

As described above, the present disclosure is associated with the mMTC scenario among the scenarios of the 5G communication system in which terminal energy efficiency and base station connection density are core indexes.

The mMTC scenarios of the 5G communication system considers a communication environment in which there are a large number of terminals for periodically or repeatedly transmitting small size uplink data.

Figure 1:
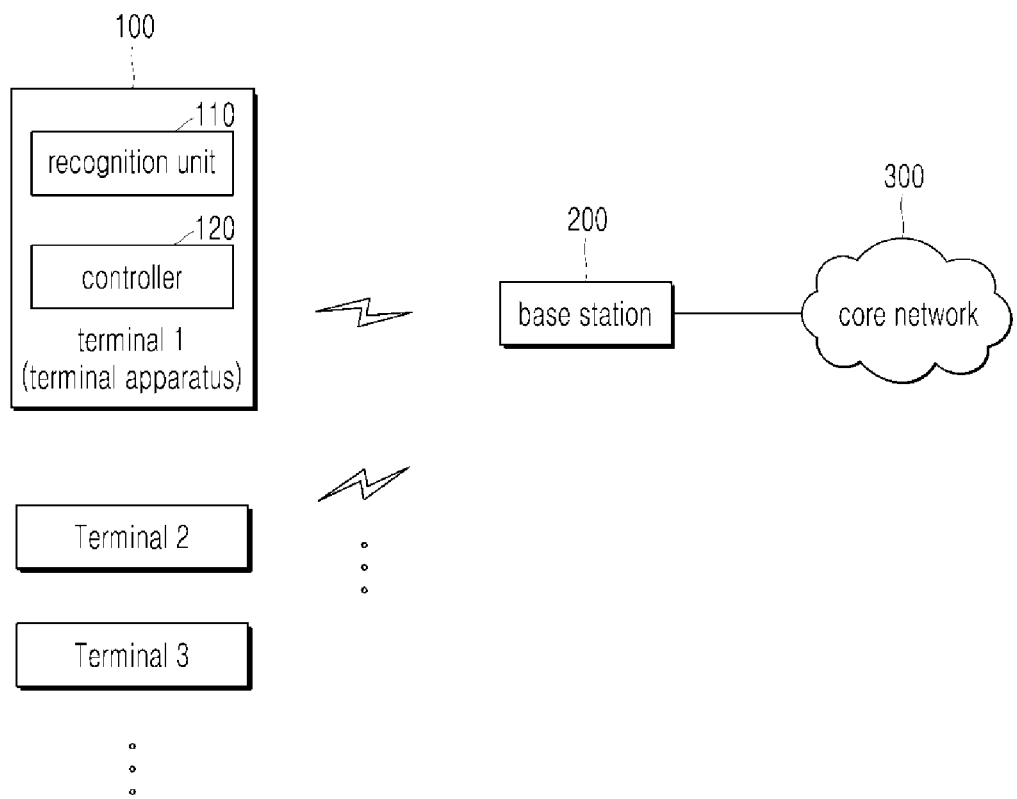
FIG. 1 is a block diagram illustrating a configuration of a terminal apparatus according to an embodiment of the present disclosure.

Accordingly, as illustrated in FIG. 1, the present disclosure is described on the basis of a communication environment in which there are a plurality of terminals 1, 2, 3 . . . connected to a core network 300 on the basis of a base station 200 and configured to transmit uplink data.

In the communication environment, the terminal apparatus of the present disclosure may correspond to a terminal using (providing) an mMTC service (hereinafter, referred to as an mMTC terminal) among the plurality of terminals 1, 2, 3 . . . .

Hereinafter, for convenience of description, a terminal apparatus 100 according to an embodiment of the present disclosure is described as terminal 1 (mMTC terminal).

As illustrated in FIG. 1, the terminal apparatus 100 according to an embodiment of the present disclosure includes a recognition unit 110 configured to recognize generation of uplink data in a specific state in which a radio section connection is released but a connection between the base station 200 and the core network 300 for the terminal apparatus 100 is configured and a controller 120 configured to transmit a specific message related to configuration of the radio section connection to the base station 200 and also transmit the uplink data along with the specific message when generation of the uplink data is recognized.

That is, the present disclosure provides a detailed method (scheme) how to transmit uplink data when uplink data is generated in a specific state in which the terminal apparatus 100 operates in the RRC-INACTIVE state.

Accordingly, the present disclosure does not limit a method by which the terminal apparatus 100 enters a specific state (RRC-INACTIVE state).

However, for example, when a service type used (provided) by the terminal apparatus 100 is the mMTC service, the terminal apparatus 100 may enter a specific state (RRC-INACTIVE state) according to control of the core network 300 or the base station 200 recognizing the service type.

Alternatively, when a transmission pattern of uplink data transmitted from the terminal apparatus 100 is periodic/repetitive transmission within a predetermined interval in small size equal to or smaller than a predetermined size, the terminal apparatus 100 may enter a specific state (RRC-INACTIVE state) according to control of the core network 300 or the base station 200 recognizing the service type.

Alternatively, for example, when the terminal apparatus 100 is a terminal using (providing) the mMTC service, the terminal apparatus 100 may enter a specific state (RRC-INACTIVE state) by itself immediately after uplink data transmission or a predetermined time elapses.

The recognition unit 110 recognizes generation of uplink data in a specific state in which the terminal apparatus operates in the RRC-INACTIVE state in which the radio section connection is released but the connection between the base station 200 and the core network 300 for the terminal apparatus 100 is configured.

That is, the recognition unit 110 recognizes whether uplink data of the service (for example, the mMTC service) used (provided) by the terminal apparatus 100 is generated.

When generation of the uplink data is recognized, the controller 120 transmits a specific message related to configuration of the radio section connection to the base station 200 and also transmits the uplink data generated this time along with the specific message.

More specifically, only when a type of the uplink data generated this time is a preset specific state transmission type, the controller 120 may transmit the uplink data generated this time along with the specific message as described above.

At this time, the specific state transmission type (RRC-INACTIVE transmission type) may be defined as the case in which a size (type) of the uplink data is equal to or smaller than a predefined threshold size.

Under the definition, when the size (type) of the data generated this time is equal to or smaller than a threshold size, the controller 120 may also transmit the uplink data while transmitting the specific message related to the configuration of the radio section connection to the base station 200.

Hereinafter, for convenience of description, a scenario in which a specific message and uplink data are transmitted together is referred to as case 1.

When the size (type) of the uplink data generated is not equal to or smaller than the threshold size, the controller 120 may switch the specific state (RRC-INACTIVE state) to a connection configuration state (RRC-CONNECTED state) in which the radio section connection with the base station 200 is configured and then transmit the uplink data through the radio section connection.

Hereinafter, for convenience of description, a scenario in which uplink data is transmitted after the specific state (RRC-INACTIVE state) switches to the connection configuration state (RRC-CONNECTED state) is referred to as case 2.

That is, when generation of uplink data is recognized in the specific state in which the terminal apparatus operates in the RRC-INACTIVE state, the controller 120 may operate in case 1 in which uplink data is immediately transmitted using a specific message which can be transmitted to the base station 200 without configuration of the radio section connection or in case 2 in which uplink data is transmitted after the specific state (RRC-INACTIVE state) switches to the connection configuration state (RRC-CONNECTED) according to whether the size (type) of the uplink data is equal to or smaller than the threshold size.

Hereinafter, the operation of case 1 will be first described in detail.

When the generated uplink data is a specific state transmission type (RRC-INACTIVE transmission type) having a size equal to or smaller than a threshold size, the controller 120 transmits a specific message related to configuration of the radio section connection and the uplink data together to the base station 200.

The specific message may be a message (RRC connection request) transmitted to make a request for the radio section connection to the base station 200.

That is, when uplink data equal to or smaller than the threshold size is generated in the specific state where the terminal apparatus operates in the RRC-INACTIVE state, the controller 120 may carry the uplink data on the RRC connection request message in a piggyback form and transmit the same to the base station 200.

When the base station 200 normally receives the RRC connection request message from the terminal apparatus 100, the base station 200 may acquire the uplink data from the RRC connection request message and transmit the uplink data to the core network 300.

The base station 200 normally receiving the RRC connection request message from the terminal apparatus 100 transmits a response message to the terminal apparatus 100.

The response message may be a message (RRC connection reconfiguration) for reconfiguring the radio section connection between the base station 200 and the terminal apparatus 100.

That is, when the base station 200 normally receives the RRC connection request message from the terminal apparatus 100 and transmits the uplink data to the core network 300, the base station 200 may transmit the response message, that is, the radio section connection recognition including information defined to maintain the current specific state (RRC-INACTIVE state) to the terminal apparatus 100.

Accordingly, when the controller 120 receives the response message (RRC connection reconfiguration message) including information defined to maintain the specific state (RRC-INACTIVE state) in response to the previously transmitted specific message (RRC connection request message), the controller 120 identifies successful transmission of the uplink data transmitted together with the specific message (RRC connection request message) and maintains the current specific state (RRC-INACTIVE state).

Further, when the controller 120 transmits the specific message and the uplink data together, the controller 120 may also transmit at least one piece of information (hereinafter, report information) among state information indicating that the terminal apparatus 100 is in the specific state (RRC-INACTIVE state) and channel state information (for example, a Channel State Indicator (CSI)) measured by the terminal apparatus 100.

The report information may be used when the base station 200 allocates uplink resources to the terminal apparatus 100 in the future.

Meanwhile, due to transmission failure based on contention-based transmission and errors in the radio section, the base station 200 may not normally receive the specific message (RRC connection request message) from the terminal apparatus 100 or may receive the specific message but not normally receive the uplink data transmitted together therewith.

In this case, when the base station 200 does not transmit the uplink data to the core network 300 since the base station 200 has not normally received the specific message or the base station 200 has received the specific message but not received the uplink data, the base station 200 may inform the terminal apparatus 100 of transmission failure.

When the controller 120 receives transmission failure of the previously transmitted specific message (RRC connection request message), the base station 200 identifies transmission failure of the uplink data transmitted together with the specific message (RRC connection request message).

Alternatively, when the controller 120 has not received a response message to the previously transmitted specific message (RRC connection request message) for a preset time, the controller 120 identifies transmission failure of the uplink data transmitted together with the specific message (RRC connection request message).

Accordingly, the controller 120 may operate in case 2 when transmission failure of the uplink data is identified in case 1 where the specific message (RRC connection request message) and the uplink data is transmitted together to the base station 200 in the specific state in which the terminal apparatus operates in the RRC-INACTIVE state.

Alternatively, when the uplink data generated this time exceeds the threshold size and is not the specific state transmission type (RRC-INACTIVE transmission type) in the specific state in which the terminal apparatus operates in the RRC-INACTIVE state, the controller 120 may operate in case 2.

Hereinafter, the operation of case 2 will be described in detail.

When transmission failure of the uplink data transmitted together with the specific message is identified in the operation of case 1, the controller 120 may operate in case 2 in which the specific state (RRC-INACTIVE state) switches to the connection configuration state (RRC-CONNECTED state) and then the uplink data is transmitted.

Alternatively, when the uplink data generated this time exceeds the threshold size and is not the specific state transmission type (RRC-INACTIVE transmission type), the controller 120 operates in case 2 in which the specific state (RRC-INACTIVE state) switches to the connection configuration state (RRC-CONNECTED state) and then the uplink data is transmitted.

Specifically, in order to switch the specific state (RRC-INACTIVE state) to the connection configuration state (RRC-CONNECTED state), the controller 120 inserts predefined state switching request identification information into the specific message related to the configuration of the radio section connection, that is, the RRC connection request message and transmits the RRC connection request message to the base station 200.

The base station 200 receives the RRC connection request message (including the state switching request identification information) for switching the specific state (RRC-INACTIVE state) to the connection configuration state (RRC-CONNECTED state) from the terminal apparatus 100 and configures the radio section connection with the terminal apparatus 100.

Further, the base station 200 transmits, to the terminal apparatus 100, a response message, that is, an RRC connection reconfiguration message including information defined to switch the specific state (RRC-INACTIVE state) to the connection configuration state (RRC-CONNECTED state) in which the radio section connection with the base station 200 is configured.

When the controller 120 receives the response message (RRC connection reconfiguration message) including information defined to switch the specific state (RRC-INACTIVE state) to the connection configuration state (RRC-CONNECTED state) in response to the previously transmitted specific message (RRC connection request message), the controller 120 configures the radio section connection with the base station 200 on the basis of information within the response message.

The controller 120 transmits uplink data through the configured radio section connection (Data Radio Bearer (DRB)) with the base station.

Accordingly, the base station 200 may transmit the uplink data received from the terminal apparatus 100 through the radio section connection to the core network 300.

When the terminal apparatus 100 configuring this radio section connection is a terminal operating in case 1 and then in case 2, the base station 200 may already have the report information received together with the specific message (RRC connection request message) from the terminal apparatus 100 in case 1.

When the base station 200 has the report information received from the terminal apparatus 100, the base station 200 may increase allocation efficiency of uplink resources by using the report information for allocating the uplink resources to the terminal apparatus 100 (UL grant).

When the terminal apparatus 100 transmits uplink data after switching to the connection configuration state (RRC-CONNECTED state), the terminal apparatus 100 may switch back to/enter the specific state (RRC-INACTIVE state) according to a rule defined later (for example, according to control of the core network 300 or the base station 200 or immediately after transmission of the uplink data or after a predetermined time elapses).

Meanwhile, the report information which the terminal apparatus 100 transmits to the base station 200 in case 1 may be used for another purpose.

For example, the base station 200 may determine whether to switch the terminal apparatus 100 from the specific state (RRC-INACTIVE state) to the connection configuration state (RRC-CONNECTED state) on the basis of the report information (state information, channel state information)

received together with the specific message (RRC connection request message) from the terminal apparatus 100.

Of course, the reference for determining whether to switch the terminal apparatus on the basis of the report information (state information and channel state information) can be variously implemented according to design and definition.

As described above, according to an embodiment of the present disclosure, a new uplink data transmission method (technology) can be implemented for the terminal operating in the specific state (RRC-INACTIVE state) to minimize possibility of transmission failure and transmit uplink data for improving energy efficiency of the terminal and connection density of the base station.

According to embodiments of the present disclosure, it is possible to derive an effect of meeting a demand of the scenario (for example, mMTC) supported by the 5G communication system and supporting service performance by implementing new uplink data transmission considering energy efficiency of the terminal and connection density of the base station.

Figure 2:
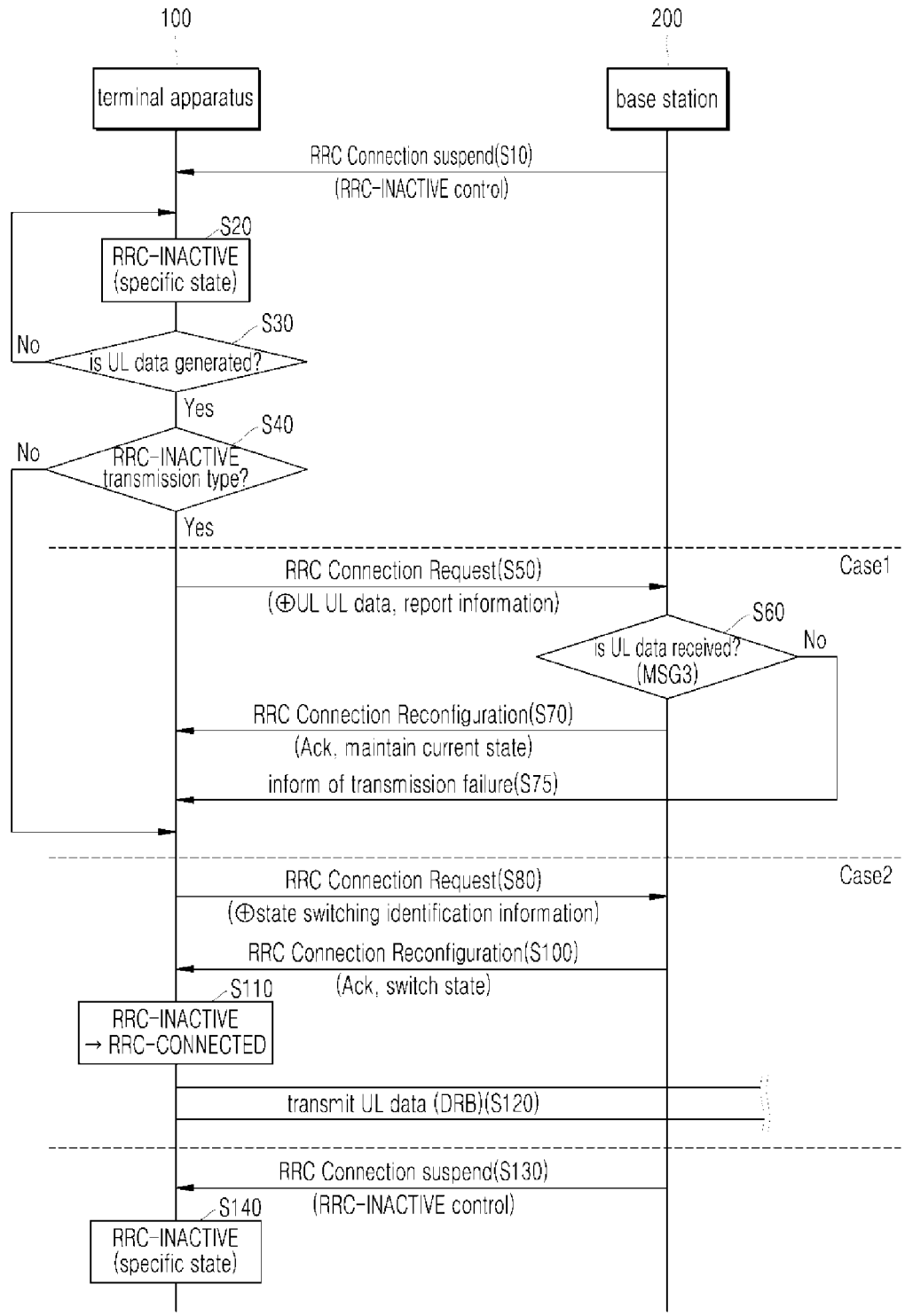
FIG. 2 is a control flowchart illustrating a method of transmitting uplink data according to an embodiment of the present disclosure.

Hereinafter, a method of transmitting uplink data according to an embodiment of the present disclosure will be described with reference to FIG. 2.

However, for convenience of description, the terminal apparatus 100 illustrated in FIG. 1 is described as an apparatus for performing the method of transmitting the uplink data.

In the method of transmitting the uplink data according to an embodiment of the present disclosure, there is no limitation on a method by which the terminal apparatus 100 enters the specific state (RRC-INACTIVE state).

For example, the terminal apparatus 100 may enter the specific state (RRC-INACTIVE state) according to control of the core network 300 or the base station 200.

Alternatively, the terminal apparatus 100 may enter the specific state (RRC-INACTIVE state) by itself.

However, hereinafter, a method by which the terminal apparatus 100 may enter the specific state (RRC-INACTIVE state) according to control of the core network 300 or the base station 200 will be described for convenience of description.

For example, when a service type used (provided) by the terminal apparatus 100 is the mMTC service, an RRC-INACTIVE control message according to control of the core network 300 or the base station 200 recognizing the service type may be transmitted from the base station 200 to the terminal apparatus 100 in S10.

Alternatively, for example, when a transmission pattern of uplink data transmitted from the terminal apparatus 100 is periodic/repetitive transmission within a predetermined interval in small size equal to or smaller than a predetermined size, the RRC-INACTIVE control message may be transmitted from the base station 200 to the terminal apparatus 100 in S10 according to control of the core network 300 or the base station 200 recognizing the transmission pattern.

The RRC-INACTIVE control message may have a format of an RRC connection suspend message.

The terminal apparatus 100 enters the specific state (RRC-INACTIVE state) in which the radio section connection is released and the connection between the base station 200 and the core network 300 for the terminal apparatus 100 is configured in S20.

In the method of transmitting the uplink data according to an embodiment of the present disclosure, the terminal apparatus 100 recognizes generation of uplink data in the specific state in which the terminal apparatus operates in the RRC-INACTIVE state in S30.

In the method of transmitting the uplink data according to an embodiment of the present disclosure, when the terminal apparatus 100 recognizes generation of the uplink data (Yes of S30), the terminal apparatus 100 identifies whether a type of the uplink data is a preset specific state transmission type (RRC-INACTIVE transmission type) in S40.

At this time, the specific state transmission type (RRC-INACTIVE transmission type) may be defined as the case in which a size (type) of the uplink data is equal to or smaller than a predefined threshold size.

In the method of transmitting the uplink data according to an embodiment of the present disclosure, when the size (type) of the data generated is equal to or smaller than a threshold size (Yes of S40), the terminal apparatus 100 operates in case 1 in which uplink data is transmitted to the base station 200 while the uplink data is carried on the specific message (RRC connection request message) related to configuration of the radio section connection in a piggyback form.

Specifically, in the method of transmitting the uplink data according to an embodiment of the present disclosure, when the size (type) of the data generated this time is equal to or smaller than a threshold size (Yes of S40), the terminal apparatus 100 carries the uplink data on the specific message (RRC connection request message) in a piggyback form and transmits the specific message to the base station 200 in S50.

More specifically, the terminal apparatus 100 transmits a preamble sequence for random access to the base station 200 (MSG1), and the base station 200 allocates uplink resources to the terminal apparatus 100 and transmits a random access response message including information of the uplink resources to the terminal apparatus 100 (MSG2).

The terminal apparatus 100 may transmit a specific message, that is, an RRC connection request message (MSG3) using the uplink resources of which allocation is recognized through the random access response message to the base station 200 and, at this time, the uplink message may be included in the specific message (RRC connection request message) and transmitted with the specific message in a piggyback form in S50.

Further, when the terminal apparatus 100 transmits the specific message, that is, the RRC connection request message (MSG3) to the base station 200 in S50, the terminal apparatus 100 may also transmit at least one piece of information (for example, report information) among state information indicating the terminal apparatus 100 is in the specific state (RRC-INACTIVE state) and channel state information (for example, a CSI) measured by the terminal apparatus 100.

When the base station 200 receives the RRC connection request message from the terminal apparatus 100 and thus normally receives the uplink data (Yes of S60), the base station 200 may transmit the uplink data acquired from the RRC connection request message to the core network 300.

The base station 200 may transmit a response message, that is, an RRC connection reconfiguration (MSG4) including information defined to maintain the current specific state (RRC-INACTIVE state), to the terminal apparatus 100 in response to the RRC connection request message in S70.

In the method of transmitting the uplink data according to an embodiment of the present disclosure, when the terminal apparatus 100 receives the response message (RRC connection reconfiguration message) including information defined to maintain the specific state (RRC-INACTIVE state) in response to the previously transmitted specific message (RRC connection request message), the terminal apparatus 100 identifies successful transmission of the uplink data transmitted together with the specific message (RRC connection request message) and maintains the current specific state (RRC-INACTIVE state).

Meanwhile, the base station 200 may not normally receive the specific message (RRC connection request message) from the terminal apparatus 100 or may receive the specific message but not normally receive the uplink data transmitted together therewith (No of S60).

In this case, when the base station 200 does not transmit the uplink data to the core network 300 since the base station 200 has not normally received the specific message or the base station 200 has received the specific message but not received the uplink data, the base station 200 may inform the terminal apparatus 100 of transmission failure in S75.

In the method of transmitting the uplink data according to an embodiment of the present disclosure, when the terminal apparatus 100 receives transmission failure of the previously transmitted specific message (RRC connection request message) from the base station 200, the terminal apparatus 100 identifies transmission failure of the uplink data transmitted together with the specific message.

Alternatively, in the method of transmitting the uplink data according to an embodiment of the present disclosure, when the terminal apparatus 100 has not received a response message to the previously transmitted specific message (RRC connection request message) for a preset time, the terminal apparatus 100 identifies transmission failure of the uplink data transmitted together with the specific message.

In the method of transmitting the uplink data according to an embodiment of the present disclosure, when the terminal apparatus 100 identifies transmission failure of the uplink data in case 1, the terminal apparatus 100 operates in case 2.

Meanwhile, in the method of transmitting the uplink data according to an embodiment of the present disclosure, when the size (type) of the data generated this time is equal to or smaller than the threshold size (No of S40), the terminal apparatus 100 operates in case 2 in which the specific state (RRC-INACTIVE state) switches to the connection configuration state (RRC-CONNECTED state) and then uplink data is transmitted.

Specifically, in the method of transmitting the uplink data according to an embodiment of the present disclosure, in order to switch the specific state (RRC-INACTIVE state) to the connection configuration state (RRC-CONNECTED state), the terminal apparatus 100 inserts predefined state switching request identification information into the specific message related to the configuration of the radio section connection, that is, the RRC connection request message and transmits the RRC connection request message to the base station 200 in S80.

More specifically, the terminal apparatus 100 transmits a preamble sequence for random access to the base station 200 (MSG1), and the base station 200 allocates uplink resources to the terminal apparatus 100 and transmits a random access response message including information of the allocated uplink resources to the terminal apparatus 100 (MSG2).

When the terminal apparatus 100 configuring this radio section connection is a terminal operating in case 1 and then in case 2, the base station 200 may already have the report information received together with the specific message (RRC connection request message) from the terminal apparatus 100 in case 1 (S50).

When the base station 200 has the report information received from the terminal apparatus 100, the base station 200 may increase allocation efficiency of uplink resources by using the report information for allocating the uplink resources to the terminal apparatus 100 (UL grant).

The terminal apparatus 100 may transmit the specific message, that is, the RRC connection request message (MSG3) including the state switching request identification information to the base station 200 using uplink resources of which allocation is recognized through the random access response message in S80.

The base station 200 receives the RRC connection request message (including the state switching request identification information) for switching the specific state (RRC-INACTIVE state) to the connection configuration state (RRC-CONNECTED state) from the terminal apparatus 100 and configures the radio section connection with the terminal apparatus 100.

Further, the base station 200 transmits, to the terminal apparatus 100, a response message, that is, an RRC connection reconfiguration message (MSG4) including information defined to switch the specific state (RRC-INACTIVE state) to the connection configuration state (RRC-CONNECTED state) in which the radio section connection with the base station 200 is configured in S100.

In the method of transmitting the uplink data according to an embodiment of the present disclosure, when the terminal apparatus 100 receives the response message (RRC connection reconfiguration message) including information defined to switch the specific state (RRC-INACTIVE state) to the connection configuration state (RRC-CONNECTED state) in response to the previously transmitted specific message (RRC connection request message), the terminal apparatus 100 configures the radio section connection with the base station 200 on the basis of information within the response message in S110 (RRC-INACTIVE→RRC-CONNECTED).

In the method of transmitting the uplink data according to an embodiment of the present disclosure, the terminal apparatus 100 transmits this uplink data through the radio section connection (Data Radio Bearer (DRB)) with the base station 200 in S120.

Accordingly, the base station 200 may transmit the uplink data received from the terminal apparatus 100 through the radio section connection to the core network 300.

When the terminal apparatus 100 transmits uplink data after changing to the connection configuration state (RRC-CONNECTED state), the terminal apparatus 100 may switch back to/enter the specific state (RRC-INACTIVE state) according to a defined rule (for example, according to control of the core network 300 or the base station 200 or immediately after transmission of the uplink data or after a predetermined time elapses).

For example, an RRC-INACTIVE control message, that is, an RRC connection suspend message according to control of the core network 300 or the base station 200 may be transmitted from the base station 200 to the terminal apparatus 100 in S130 (the same as S10).

Accordingly, the terminal apparatus 100 may enter again the specific state (RRC-INACTIVE state) in S140 (the same as S20).

As described above, according to an embodiment of the present disclosure, in order to improve energy efficiency on the side of the terminal and connection density on the side of the base station, a new uplink data transmission method (technology) by which the terminal operating in the specific state (RRC-INACTIVE state) minimizes possibility of transmission failure and transmits uplink data can be implemented.

According to embodiments of the present disclosure, it is possible to derive an effect of meeting a demand of the scenario (for example, mMTC) supported by the 5G communication system and supporting service performance by implementing new uplink data transmission considering energy efficiency of a terminal and connection density of a base station.

The method of transmitting the uplink data according to an embodiment of the present disclosure can be implemented in the form of a program instruction executable through various computer means and thus recorded in a computer-readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

What is claimed is:

1. A terminal apparatus comprising:
    a recognition unit configured to recognize generation of uplink data in a specific state in which a radio section connection is released and a connection between a core network and a base station for the terminal apparatus is configured; and
    a controller configured to:
        transmit a specific message related to configuration of the radio section connection to the base station when the generation of the uplink data is recognized, and
        transmit, to the base station, the uplink data together with the specific message when the specific message is transmitted, and
        transmit, to the base station, channel state information measured by the terminal apparatus when the specific message and the uplink data is transmitted to the base station, thereby the base station being able to use the channel state information to allocate uplink resource to the terminal apparatus,
        wherein the channel state information is to be transmitted simultaneously with the uplink data and the specific message.

2. The terminal apparatus of claim 1, wherein the controller transmits the uplink data with the specific message, only when the uplink data is a preset specific state transmission type.

3. The terminal apparatus of claim 2, wherein the uplink data is the specific state transmission type, when a size of the uplink data is equal to or smaller than a predefined threshold size.

4. The terminal apparatus of claim 1, wherein the controller transmits state information indicating that the terminal apparatus is in the specific state when the specific message and the uplink data is transmitted, thereby the base station being able to use the information to allocate uplink resource to the terminal apparatus.

5. The terminal apparatus of claim 1, wherein the controller switches the specific state to a connection configuration state in which the radio section connection with the base station is configured and transmits the uplink data through the radio section connection, when transmission failure of the uplink data is identified.

6. The terminal apparatus of claim 2, wherein the controller switches the specific state to a connection configuration state in which the radio section connection with the base station is configured and transmits the uplink data through the radio section connection, when the uplink data is not the specific state transmission type.

7. The terminal apparatus of claim 1, wherein the controller identifies transmission success of the uplink data transmitted together with the specific message and maintains the specific state, when a response message including information defined to maintain the specific state is received in response to the specific message.

8. The terminal apparatus of claim 1, wherein the controller identifies transmission failure of the uplink data transmitted together with the specific message, when a response message to the specific message for a preset time is not received or transmission failure is received.

9. The terminal apparatus of claim 5, wherein the controller inserts predefined state switching request identification information into the specific message related to configuration of the radio section connection and transmits the specific message to the base station in order to switch the specific state to the connection configuration state.

10. The terminal apparatus of claim 9, wherein the controller receives a response message including information defined to switch the specific state to the connection configuration state in which the radio section connection with the base station is configured in response to the specific message, and configures the radio section connection with the base station based on information within the response message.

11. The terminal apparatus of claim 1, wherein the specific message is a message (RRC connection request) transmitted by the terminal apparatus to make a request for the radio section connection to the base station.

12. The terminal apparatus of claim 7, wherein the response message is a message (RRC connection reconfiguration) for reconfiguring the radio section connection between the base station and the terminal apparatus.

13. A method of transmitting uplink data by a terminal apparatus, the method comprising:
    recognizing generation of uplink data in a specific state in which a radio section connection is released and a connection between a core network and a base station for the terminal apparatus is configured; and
    transmitting a specific message related to configuration of the radio section connection to the base station when the generation of the uplink data is recognized, transmitting, to the base station, the uplink data together with the specific message when the specific message is transmitted, and transmitting, to the base station, channel state information measured by the terminal apparatus when the specific message and the uplink data is transmitted to the base station, thereby the base station being able to use the channel state information to allocate uplink resource to the terminal apparatus, wherein the channel state information is to be transmitted simultaneously with the uplink data and the specific message.

14. The method of claim 13, wherein the transmitting comprises transmitting the specific message and the uplink data only when the uplink data is a preset specific state transmission type.

15. The method of claim 13, further comprising switching the specific state to a connection configuration state in which the radio section connection with the base station is configured and transmitting the uplink data through the radio section connection, when transmission failure of the uplink data is identified.

16. The method of claim 14, further comprising switching the specific state to a connection configuration state in which the radio section connection with the base station is configured and transmitting the uplink data through the radio section connection, when the uplink data is not the specific state transmission type.

* * * * *